United States Patent
Miller et al.

(10) Patent No.: US 7,874,525 B2
(45) Date of Patent: *Jan. 25, 2011

(54) METHOD AND SYSTEM FOR FULLY FIXED VEHICLE CONTROL SURFACES

(75) Inventors: Daniel N. Miller, Bainbridge Island, WA (US); Brent N. McCallum, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 855 days.

This patent is subject to a terminal disclaimer.

(21) Appl. No.: 11/417,417

(22) Filed: May 4, 2006

(65) Prior Publication Data

US 2009/0308980 A1   Dec. 17, 2009

(51) Int. Cl.
*B64C 21/04*   (2006.01)
(52) U.S. Cl. ..................................... 244/207
(58) Field of Classification Search .............. 244/207, 244/130, 36, 52; 239/418, 102.1, 102.2
See application file for complete search history.

(56) References Cited

U.S. PATENT DOCUMENTS

| | | | |
|---|---|---|---|
| 4,516,747 A * | 5/1985 | Lurz | 244/204 |
| 6,119,987 A * | 9/2000 | Kiknadze et al. | 244/204 |
| 6,457,654 B1 * | 10/2002 | Glezer et al. | 239/4 |
| 6,682,021 B1 * | 1/2004 | Truax et al. | 244/201 |
| 6,751,530 B2 * | 6/2004 | Seifert et al. | 701/4 |

* cited by examiner

*Primary Examiner*—Tien Dinh
(74) *Attorney, Agent, or Firm*—Bracewell & Giuliani LLP

(57) ABSTRACT

A fully fixed, non-articulating geometry vehicle that includes a number of virtual control surfaces operable to replicate a mechanical control surface's functionality. These virtual control surfaces further include a number of flow control devices on the non-articulating vehicle surface. The plurality of flow control surfaces is operable to induce secondary flow structure(s) within a boundary layer of a fluid flow over the non-articulating vehicle surface. A virtual control surface controller is operable to dynamically adjust a frequency and amplitude of the secondary flow structure(s) in order to reposition the virtual control surface. A vehicle control and stability system communicatively coupled to the plurality of virtual control surfaces is operable to direct positioning of the plurality of virtual control surfaces in response to vehicle control commands.

11 Claims, 13 Drawing Sheets

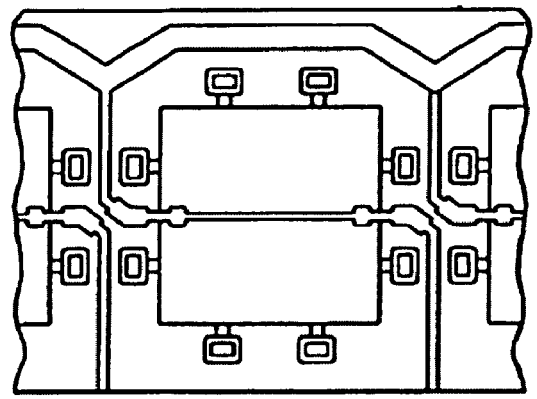
FIG. 10A mems sheer sensor
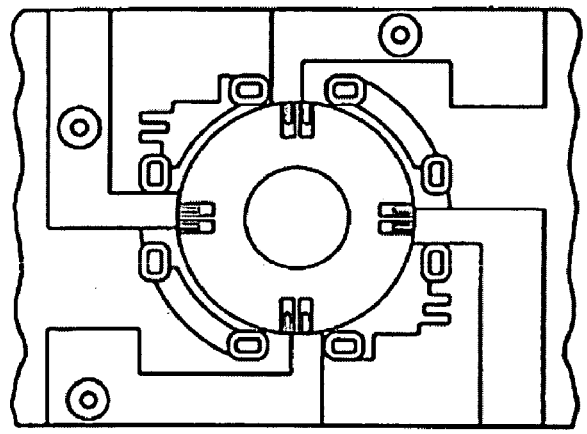
FIG. 10B mems pressure sensor
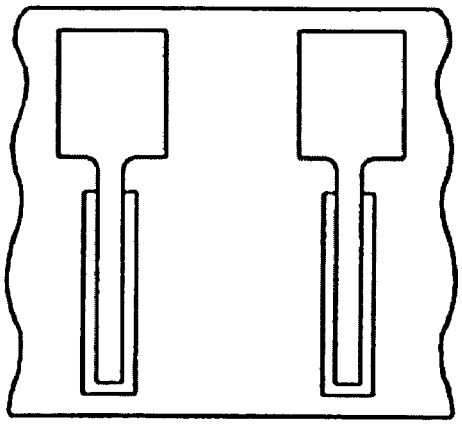
FIG. 10C mems velocity sensor

METHOD AND SYSTEM FOR FULLY FIXED VEHICLE CONTROL SURFACES

TECHNICAL FIELD OF THE INVENTION

The present invention relates generally to the integration of the control surface within aircraft and more particularly, a system and method for implementing control surfaces within non-articulating vehicular surfaces.

BACKGROUND OF THE INVENTION

Aircraft typically require complex, heavy, mechanical flap surface actuation systems for vehicle flight stability and control. While very effective aerodynamically, these flap-based controls require powerful and heavy hydraulic or electric actuation systems to move the flap effectors. Furthermore, the flap surfaces are structurally inefficient in that they introduce discontinuities in the airframe surface which requires additional structural weight for support. Current emphasis for next-generation aircraft require a dramatically reduction in airframe weight and cost while maintaining performance and capability.

The aerodynamic design and integration of the control surfaces within next generation aircraft plays a major role in determining the capability and configuration of these aircraft. Next generation tailless aircraft, such as a blended wing body (BWB) configuration, will be highly integrated where components are buried or submerged into the platform. Additionally, exotic shapes may cause excessive propulsion performance losses. These losses may emanate from strong secondary flow gradients in the near wall boundary of the fluid flow, which produce large-scale vortical flow field structures. Flow field detachments may produce increased body drag and aerodynamic buffeting. All of which comprise the integrity and capability of these aircraft.

In the past, adverse flow fields were avoided or addressed by the aircraft's design. Alternatively, active control surface have been used to address flow field structures associated with exotic shapes. For example, the overall aircraft could be lengthened to prevent aft body flow field detachments or additional control surfaces could be incorporated into the vehicle to also prevent aft body flow field detachments. Other solutions may have required that certain components be structurally hardened (increasing weight) or replaced more frequently to avoid failures resulting from these stresses. Components may also be repositioned to non-optimal positions to reduce these stresses. However, these situations often results in reduced vehicle performance. Similarly, adding structural weight to support increased stress loads and also results in reduced vehicle performance.

The aerodynamic design and integration of the control surfaces plays a major role in determining the capability and configuration of aircraft such as the unmanned aerial vehicle (UAV), long-range strike (LRS), and multi-mission air mobility systems. To enable advances in vehicle design, groundbreaking aerodynamic technologies are required to integrate control surfaces into these advanced platforms. New technologies are required to meet the more restrictive requirements associated with reduced weight/volume and mechanical complexity while aerodynamically accommodating exotic vehicle shaping requirements, without compromising functionality and performance.

To address integration issues associated with control surfaces, previous solutions required additional hydraulic and structural systems to support the required control systems. The consequences of such solutions compromises vehicle capability.

New technology is therefore needed which will allow greater freedom to integrate control systems within advanced aircraft designs. The benefits of such integrated designs for advanced platforms will be to enable reduced vehicle size and weight, favorable movement of vehicle center of gravity (Cg) forward, reduced drag, reduced aft body structural heating, and improved flight performance. Application of such a technology is not only limited to being a design enabler for future all-wing air-vehicle designs, but also could be applied to existing aircraft that improves vehicle control.

Further limitations and disadvantages of conventional control surfaces and related functionality will become apparent to one of ordinary skill in the art through comparison with the present invention described herein.

SUMMARY OF THE INVENTION

Embodiments to the present invention provide a non-articulating vehicle control surface that substantially addresses the above identified needs. More particularly, embodiments of the present invention provide a non-articulating vehicle control surface that includes a number of flow control devices on the non-articulating vehicle surfaces, and a control system communicatively coupled to flow control devices. The flow control devices induce secondary flow structures that may become trapped within a boundary layer of fluid flow over the non-articulating vehicle surface. These secondary flow structures provide the basis for a dynamic virtual control surface. The control system, coupled to the flow control devices, may direct the flow control devices in order to adjust the frequency and/or amplitude of the secondary flow structures in order to create and position dynamic virtual control surfaces.

Yet another embodiment provides a method to control fully fixed, non-articulating geometry vehicle. This involves the steps of placing a number of flow control devices on a non-articulating vehicle surface. Secondary flow structures may then be induced within a boundary layer of fluid flow over the non-articulating vehicle surface. Secondary flow structures provide the basis for a number of virtual control surfaces. These virtual control surfaces may be repositioned by adjusting the frequency and amplitude of the secondary flow structures as directed by commands from a vehicle control system. These flow control devices may be made of micro-jet arrays or micro-electro mechanical (MEMS) devices. The secondary flow structures may be trapped as previously stated to form the basis of the virtual control surface. These virtual control surfaces may replicate a mechanical control surface's functionality. This allows the fully fixed non-articulating geometry vehicle to be implemented as an aircraft, submarine, boat, or other like aircraft.

Yet another embodiment of the present invention provides a vehicle control and stability system for a fully fixed non-articulating geometry vehicle. The vehicle control and stability system includes a number of virtual control surfaces, and a control system communicatively coupled to the virtual control surfaces. The virtual control surfaces may include a number of flow control devices that induce secondary flow structures over the non-articulating vehicle surfaces in order to form the basis of the virtual control surface. A virtual control surface controller is able to dynamically adjust the frequency and amplitude of the secondary flow structures in order to reposition the flow control surface by controlling the output of the flow control devices. The control system coupled to the virtual control system may direct the repositioning of the virtual control surface in response to vehicle control command or stability commands.

Embodiments of the present invention may use minimally intrusive arrays of flow control devices to create and manipulate virtual control surfaces. The arrays of flow control devices are smaller, lighter weight, more efficient, lower drag, and less visible than conventional control surfaces. The virtual control surfaces offered by embodiments of the present invention will help to enable next generation aircraft and improve the capabilities of existing aircraft.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 10A-10C depict various potential sensors that may be used to sense flow conditions in accordance with embodiments of the present invention;

DETAILED DESCRIPTION OF THE INVENTION

Preferred embodiments of the present invention are illustrated in the figures like numerals being used to refer to like and corresponding parts of the various drawings.

The present invention provides a fully fixed, non-articulating geometry vehicle that substantially eliminates or reduces disadvantages and problems associated with previous designs.

Figure 1:
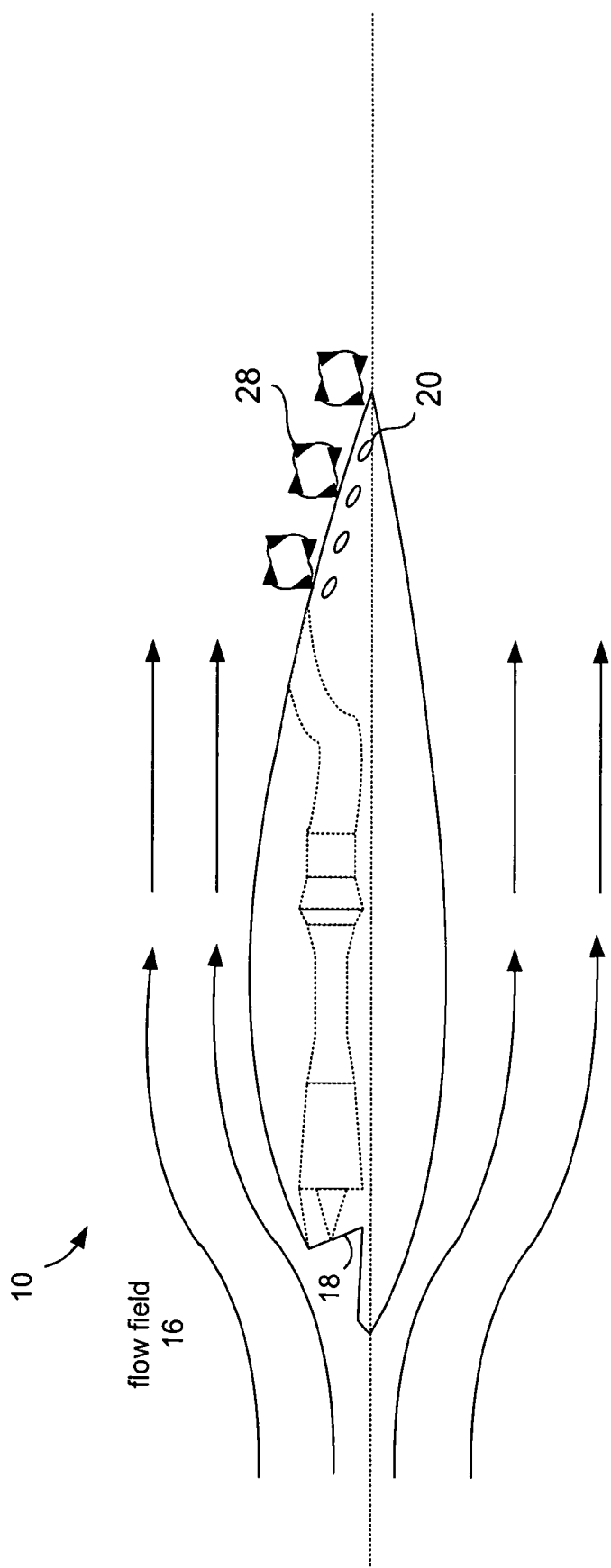
FIG. 1 provides a side view of a fully fixed, non-articulating geometry vehicle that may employ virtual control surfaces in accordance with embodiments of the present invention.
Figure 2:
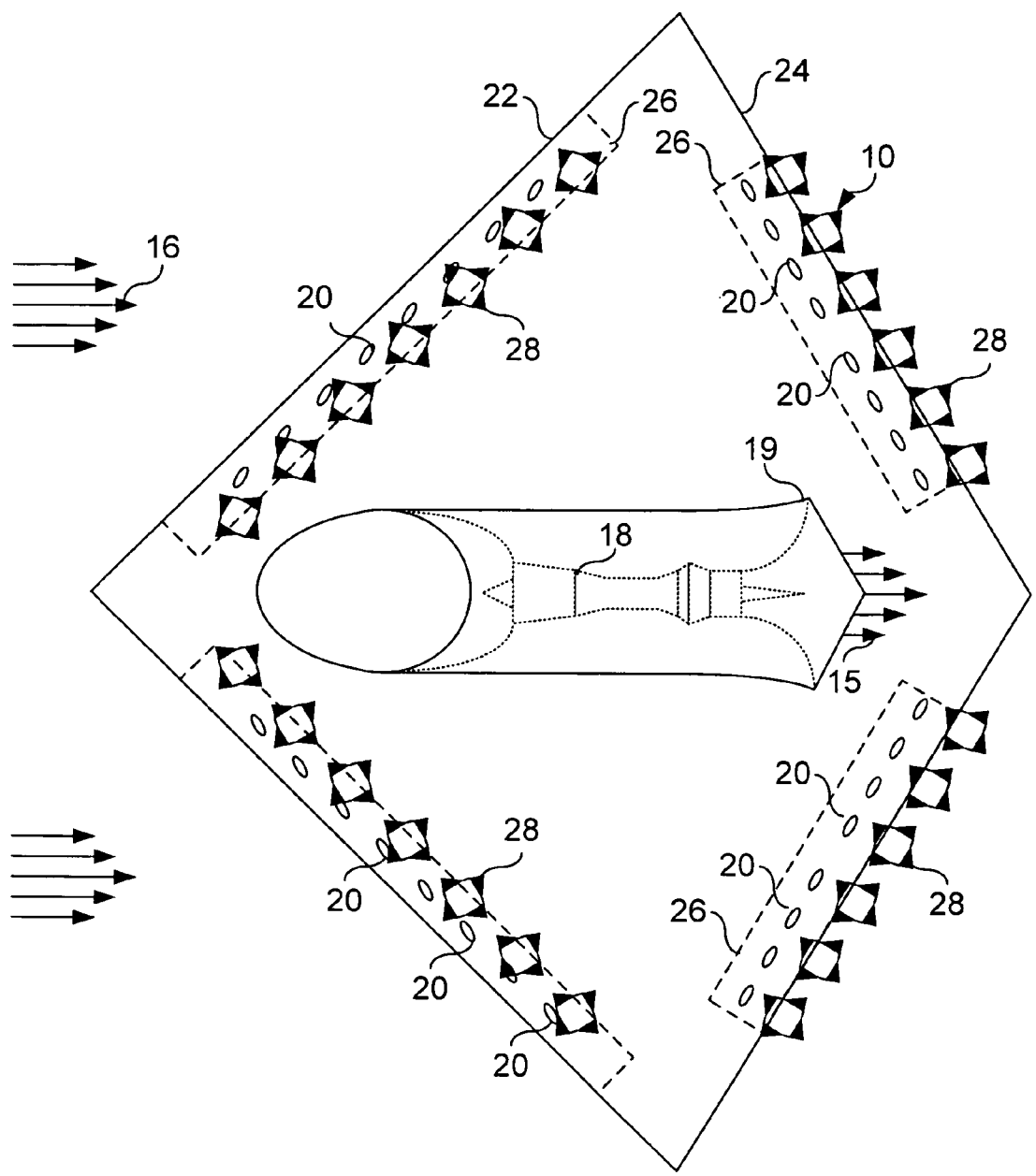
FIG. 2 provides a top down view of a fully fixed, non-articulating geometry vehicle that may employ virtual control surfaces in accordance with embodiments of the present invention.

FIG. 1 provides a cross sectional view of a fully fixed, non-articulating geometry vehicle such as aircraft 10. FIG. 2 provides a top-down view of aircraft 10. Aircraft 10 may be a blended wing body (BWB) aircraft wherein engine 18 is submerged within the BWB of aircraft 10. Distributed arrays of flow control devices 20 submerged in the boundary layer along the leading edge 22 and trailing edge 24 help create or define virtual control surfaces 26 by inducing secondary flow structures 28.

Flow control devices 20 may include arrays of small scale positive displacement sub-boundary layer vanes (i.e. micro vanes) and/or conformal jet (i.e. micro-jets) that are sized on the order of the momentum thickness (rather than the full boundary layer thickness). These micro vanes and micro-jets may be employed as active, passive, or a combination of both passive and active flow control devices.

Figure 3:
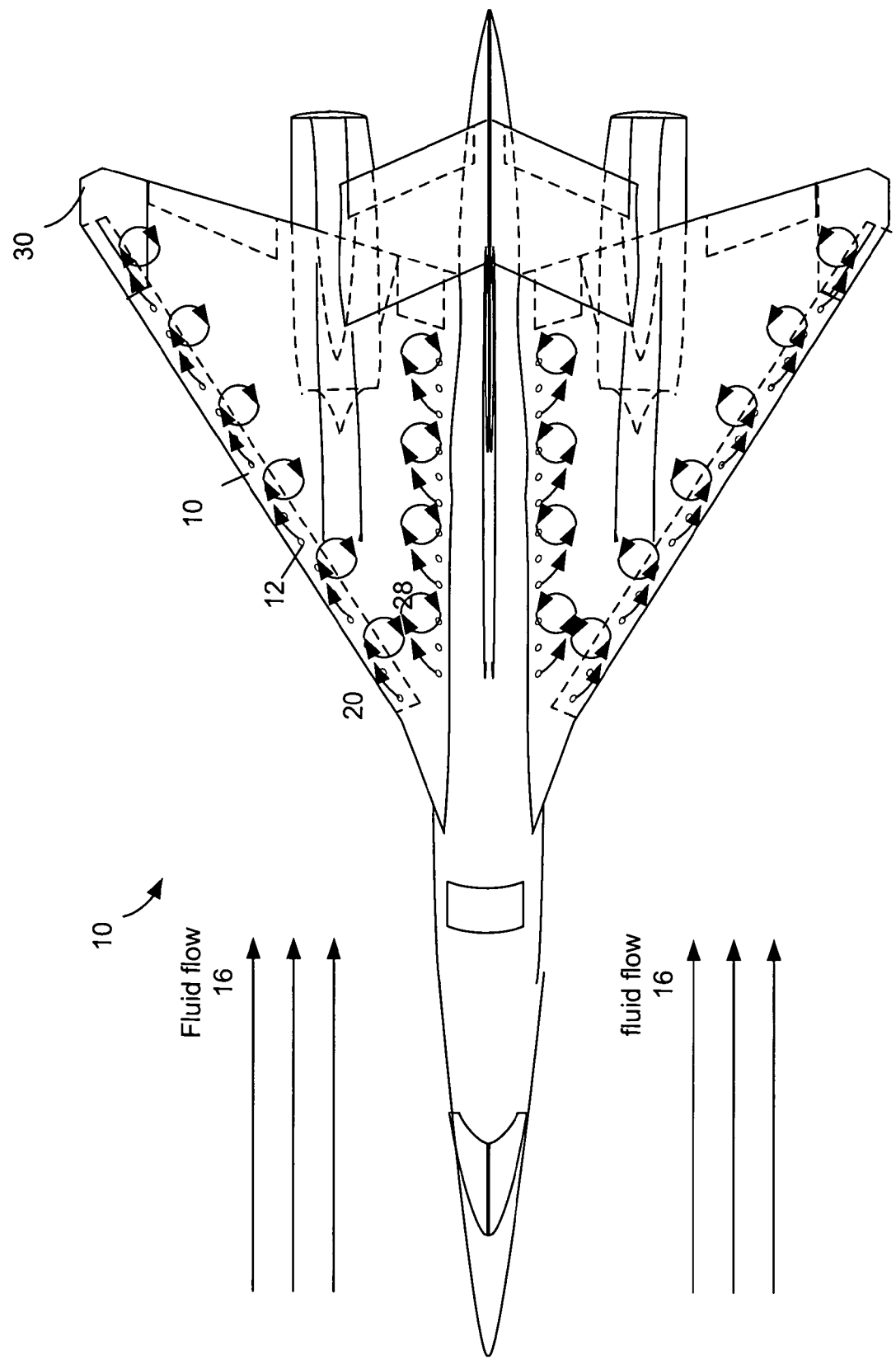
FIG. 3 depicts an array of micro-jets operable to introduce secondary flow structures that form virtual control surfaces in accordance with the present invention.

FIG. 3 shows a top down or plan view of another embodiment of a fully fixed, non-articulating geometry aircraft 10. Micro-jets 20 are oriented to produce a micro-jet flows at an angle to fluid flow 16. Micro-jet flows 20 induce secondary flow structures 28 within the boundary layer between the fluid flow 16 and aerodynamic surfaces of aircraft 10. The micro jets depicted in FIGS. 1, 2 and 3 are oriented such that secondary flow structures 28 may become trapped over the aerodynamic surfaces of aircraft 10. These trapped secondary flow structures may then form the basis of virtual control surface 26 where the virtual control surface replicates the functions on a traditional mechanical control surface. By manipulating the frequency and amplitude of the micro jets the virtual control surfaces may be repositioned to control and stabilize the aircraft. The micro jets may be installed to produce a virtual control surface on any surface of the vehicle. As shown, they have been located on the leading edge, trailing edge, or to produce span-wise virtual surfaces to control the vehicle.

One potential implementation applies these virtual control surfaces to a vehicle, such as but not limited to aircraft. FIGS. 1 through 5, the virtual control surfaces are located on an aircraft. Other vehicles such as automobiles, trucks, trains, boats, that are sensitive to aerodynamic constraints may have the virtual control surfaces applied to address aerodynamic concerns and improve the performance of these vehicles. Hydrodynamic vehicles such as boats or submarines may employ similar virtual control surfaces to realize hydrodynamic fully fixed, non-articulating geometry vehicles.

Figure 6:
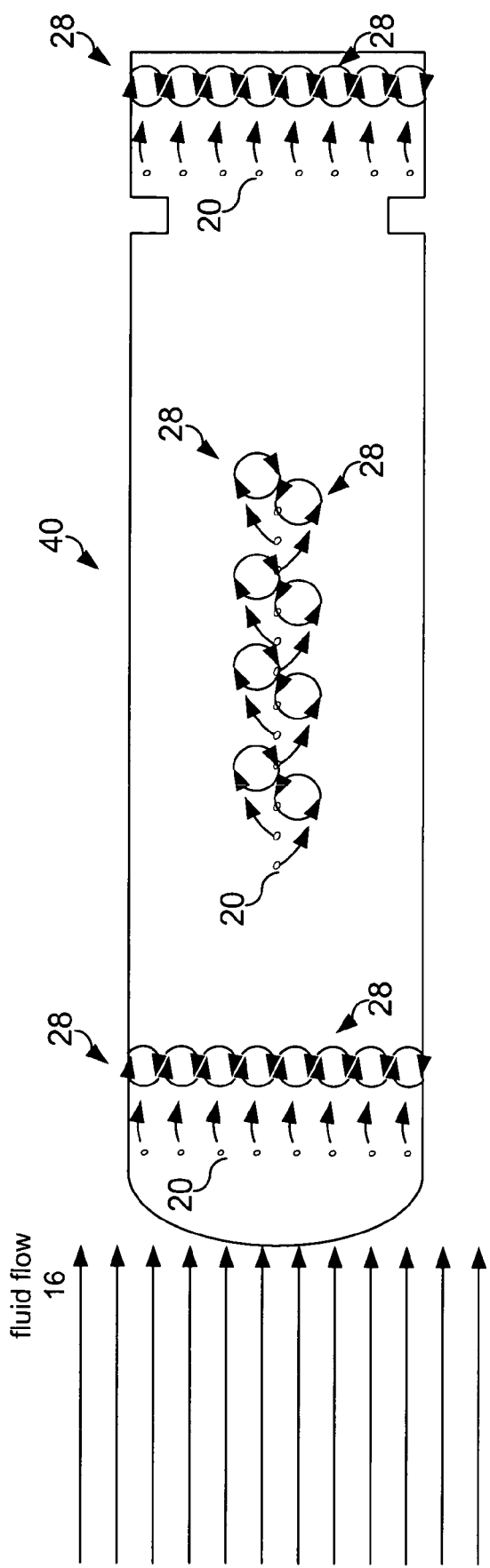
FIG. 6 provides a side view of a fully fixed, non-articulating geometry submersible vehicle that may employ virtual control surfaces in accordance with embodiments of the present invention.

FIG. 6 provides an illustration where an underwater vehicle 40 has microjets 20 placed on the surface in order to form virtual control surfaces which may be used to manipulate or control the maneuvering of the underwater vehicle 40. In this embodiment, the microjets or like devices may be placed in horizontal or vertical arrays on the surface of the vehicle and may be placed near the forward or aft depending how the virtual control surfaces are intended to affect control of the movement of the underwater vehicle 40. Additionally these microjets may be used to manipulate fluid flow 16 which in this case is a hydrodynamic fluid and reduce noise or resistance to flow associated with the underwater vehicle 40. In other embodiments where the underwater vehicle is maintained within a gaseous envelope these microjets may also be used to create virtual control surfaces which control or enhance the control and stability of the underwater vehicle.

Virtual control surfaces can also manipulate flow field vortices generated from the trailing edge of external components on the aircraft. These flow field vortices can adversely affect downstream components of the aircraft such as but not limited to engines, weapons, fuel or storage nacelles, after body structures, such as the tail or empennage, control surfaces, canards, wings, air intake inlets, such as engine air inlets or sensor air inlets, or other downstream components known to those skilled in the art.

Within FIG. 3 arrays of micro-jets 20 have been placed on the leading edge 22 of wing 30. Similar micro jets may be placed on the trailing edges as well. Micro-jets 20 introduce micro-jet flows that in turn induce secondary flow structures 28. These secondary flow structures may be trapped to form the basis of virtual control surfaces 26. These secondary flow structures may also influence the inception point, size, and trajectory of flow field vortices away from downstream components. By eliminating mechanical control systems, the structural requirements for these control surfaces may be reduced. By reducing the buffeting and fatigue caused on downstream components, the structural requirements for these components may be reduced.

Figure 4:
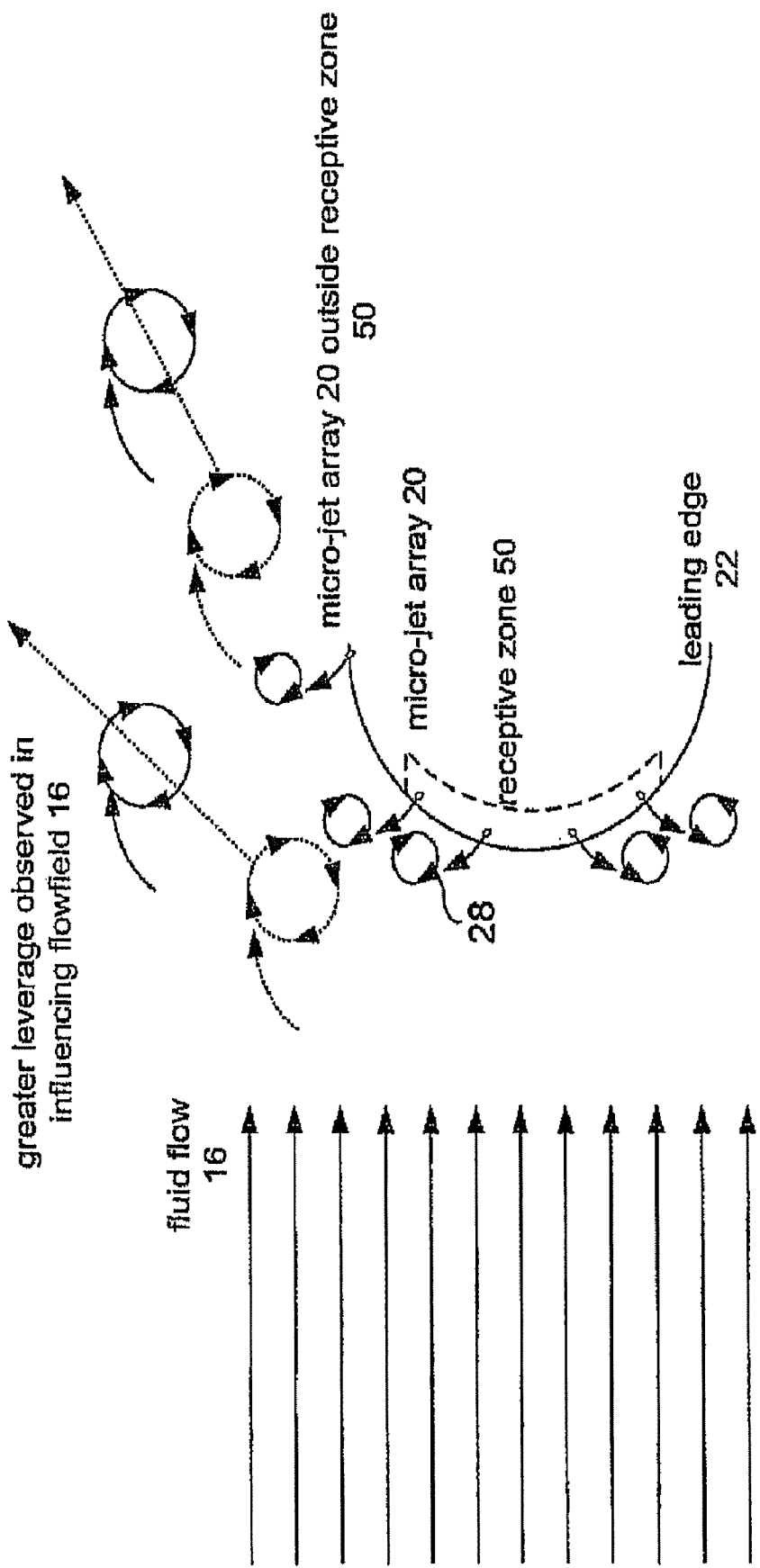
FIG. 4 depicts various arrays of flow control devices that produce virtual control surfaces within a fully fixed, non-articulating geometry vehicle in accordance with embodiments of the present invention.

FIG. 4 shows a cross section of the leading edge of wing 34. Here, the trapped secondary flow structures 28 are shown to be placed in a receptive zone 50 along the out edge of leading edge 22. For illustration purposes, an array of micro-jets 20 is shown located outside the receptive zone 50. When comparing the influence on trapped secondary flow structures 28 between micro-jet arrays 20 located within receptive zone 50 and outside receptive zone 50 one may observe a greater leverage in influencing the flow field 16 over the aerodynamic surface. Although micro-jet arrays may be placed at any location within the aerodynamic surfaces, it may be preferential to specifically place micro-jet arrays within receptive zones along the leading or trailing edges or other locations of the aerodynamic surface in order to realize an increased leverage in influencing flow fields over the from downstream components.

Figure 5:
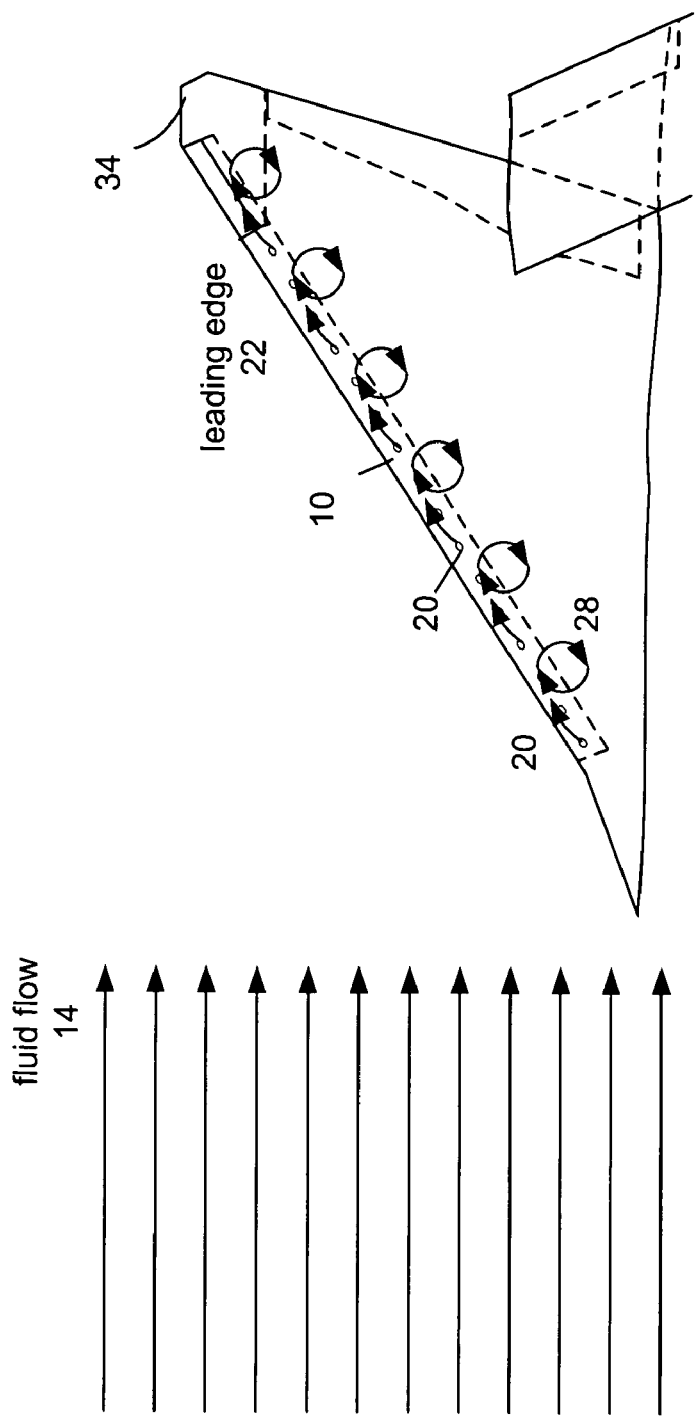
FIG. 5 provides a top down view of an array of flow control devices in the aft body region and trailing edge of a fully fixed, non-articulating geometry vehicle in accordance with embodiments of the present invention.

FIG. 5 depicts a plan view of wing 34 within fluid flow 16. Again one observes that micro-jet 20 are located along the leading edge 36 to provide a virtual control surface with increased lateral leverage over flow field 16. This increases the ability of secondary flow structures 28 to achieve the desired vehicle control and stability.

Figure 7:
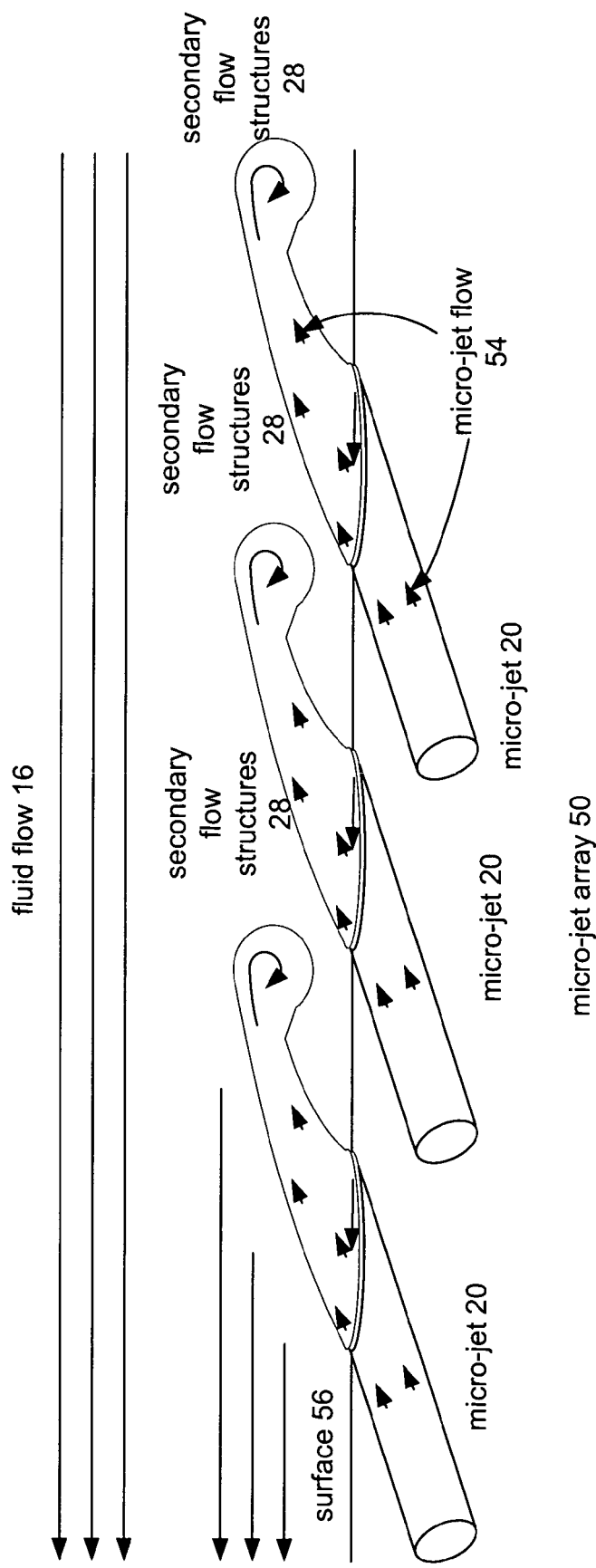
FIG. 7 depicts an array of flow control devices, such as micro-jets operable to reposition virtual control surfaces in accordance with embodiments of the present invention.

FIG. 7 depicts an array 50 of flow control devices, such as micro-jets 20. Alternate embodiments may supplement or replace micro-jets 20 with micro vanes or other like flow control devices. The micro jets, micro vanes or other like flow control devices are submerged within the boundary layer. As shown, micro-jets 20 introduce a micro-jet flow 54 that causes disturbances 28 that may be trapped between the flow field and aerodynamic surface 56. Thus, flow control device 20 introduces disturbances 28 that form the basis of virtual control surfaces that manipulate and redirect fluid flow 16. The output of flow control devices 20 is operable to be adjusted in frequency and amplitude so as to manipulate the position of the virtual control surfaces in order to replicate the functionality of a mechanical control surface.

One potential implementation applies these flow control devices arrays to a vehicle, such as but not limited to aircraft of FIGS. 1-5. Other aerodynamic vehicles such as automobiles, trucks, trains, and boats that are sensitive to aerodynamic constraints may have the flow control device arrays applied to address aerodynamic concerns and improve the aerodynamic performance of these vehicles.

These micro-jet arrays 54 may use continuous or pulsating air jets for boundary layer control. These micro-jets, which may be placed above and below the exhaust nozzle, manipulate the shedding, size, and trajectory of vortical structures as well as the boundary layer to improve the control and stability of aircraft 10.

Figure 8:
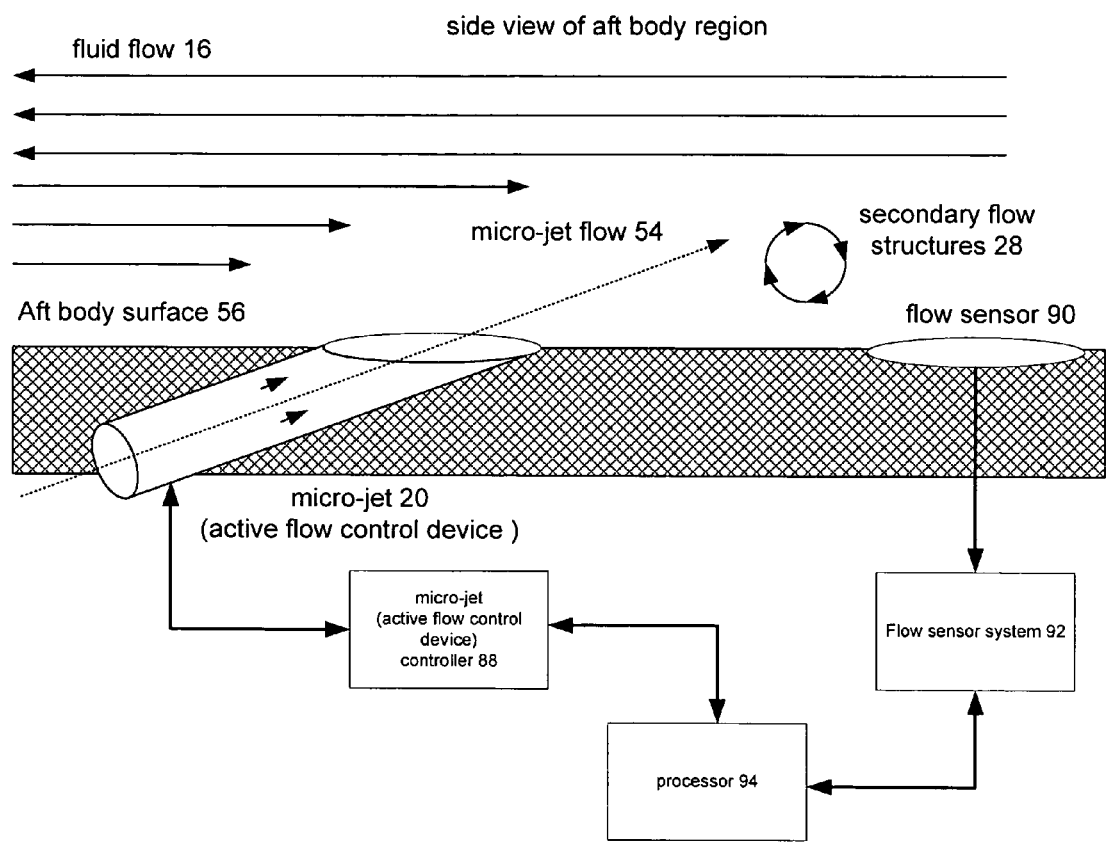
FIG. 8 provides a functional diagram of a vehicle control and stability system operable to reposition virtual control surfaces in response to sensed flow conditions and vehicle control commands in accordance with embodiments of the present invention.

FIG. 8 depicts an aerodynamic surface within the aft body region of aircraft 10. Here arrays of flow control devices 20 are located within the leading and trailing edges of the aircraft. Flow control devices 20 introduce micro-jet flow 54 to create secondary flow structures that may be trapped between the flow field and aerodynamic surface 56. Thus, flow control device 20 introduces disturbances 28 that form the basis of virtual control surfaces that manipulate and redirect fluid flow 16. The output of flow control devices 20 is operable to be adjusted in frequency and amplitude so as to manipulate the position of the virtual control surfaces in order to replicate the functionality of a mechanical control surface.

A control system, such as flow control device controller 88, may be operably coupled to active flow control devices 20. This control system is operable to actively direct the introduction of secondary flows 28 in order to achieve a desired fluid flow 16 over the aerodynamic surface.

This active control may be further complemented by a sensing system operably coupled to the flow control device controllers. This sensing system may employ flow sensors 90 located at various locations along the aerodynamic surface. These flow sensors are operable to detect the characteristics of fluid flow 16 over the aerodynamic surface. Sensor outputs are provided to flow sensor system 92 and processor 94. Processor 94 compares the detected fluid flow characteristics over the aerodynamic surface with a desired fluid flow characteristic. Then processor 94 will actively direct flow control device controller 88 to introduce secondary flows 86 to achieve a desired fluid flow over the aft body region.

Processor 94 and controller 88 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

As previously stated, these flow control devices and flow sensors may be incorporated in any aerodynamic surface. However, in many instances, more value may be realized by placing these systems within receptive zones of the aft body region. The desired fluid flow may avoid having flow field vortical structures adversely impact the aft body region components. The desired fluid flow also reduces the fatigue, buffeting or required hardening of the aft body region.

Micro-jets are very-small-scale devices. In some embodiments theses jets are on the order of one-tenth of the boundary layer thickness. These micro-jets may be miniature vortex generators or vortex generator jets fabricated in many ways and applied as an appliqué to or cast into the surface. The micro-jets may be miniature fluidic jets that introduce momentum in the form of micro-jet flows. These micro-jet flows may be continuous or pulsed and may be bled from the primary flow associated with an engine. Micro-jets may also be micro fabricated mechanical structures incorporated on or in the aerodynamic surface. These may also be synthetic pulsators. Other similarly sized jets, known to those skilled in the art, may also be used as the micro-jets.

Figure 9A:
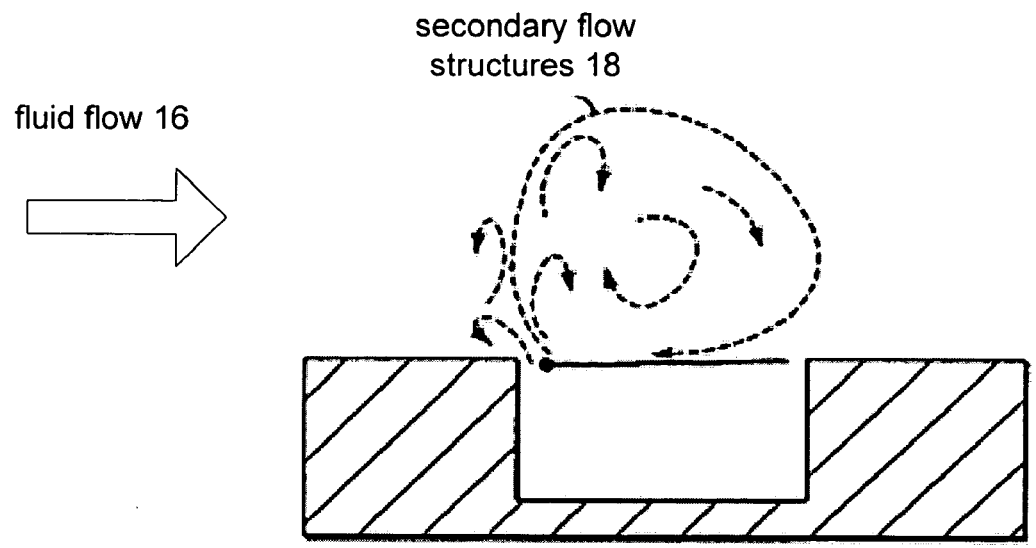
FIGS. 9A-9D depict various potential micro-jets or like devices that may be used to create virtual control surfaces in accordance with embodiments of the present invention.
Figure 9B:
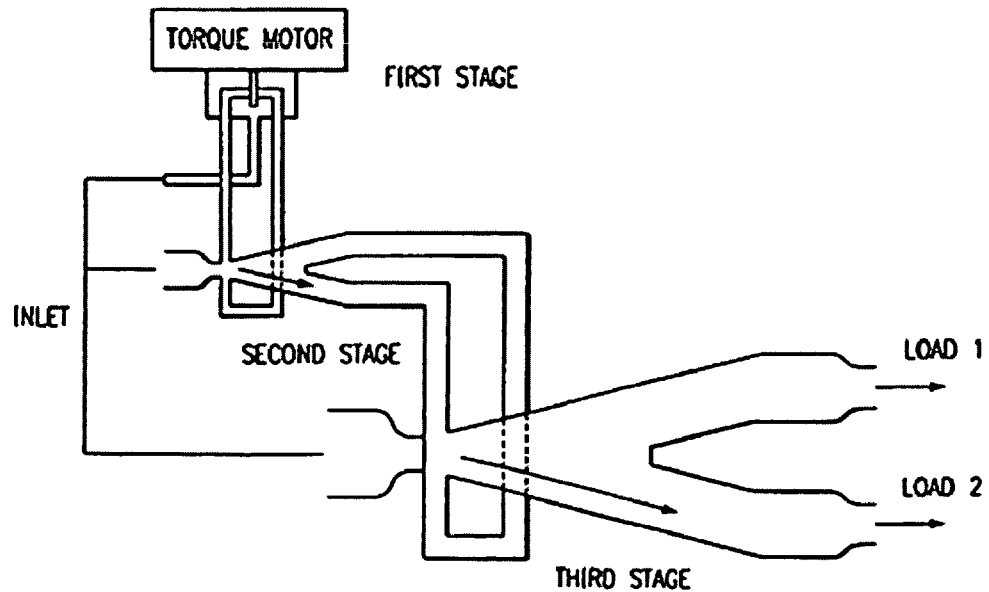

FIGS. 9A-9D illustrates many examples of micro fabricated electro-mechanical structures (MEMS) which may be used as these micro-jets. FIG. 9A depicts a fluidic effector creating secondary flows structures as primary fluid flow 16 passes over fluidic effector. FIG. 9B depicts a pulsing effector. A fluidic oscillator alternates flow between two outflow legs by injecting high pressure on either side of the nozzle orifice. Injecting at Input 1 causes flow to exit the device at Output 2, and injecting at Input 2 causes flow to exit the device at Output 1. The Input flow can come from a like, but smaller device (Second Stage) or from a mechanically driven valve (First Stage).

Figure 9C:
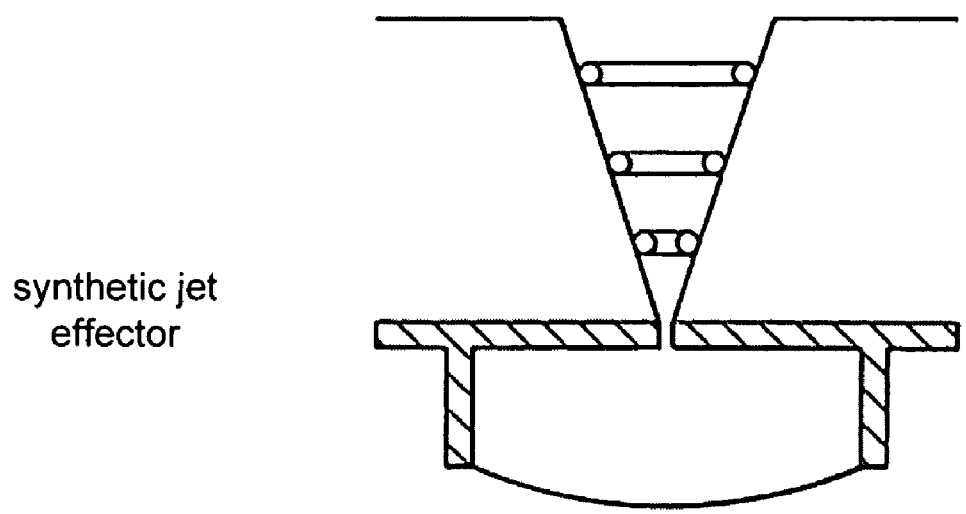
Figure 9D:
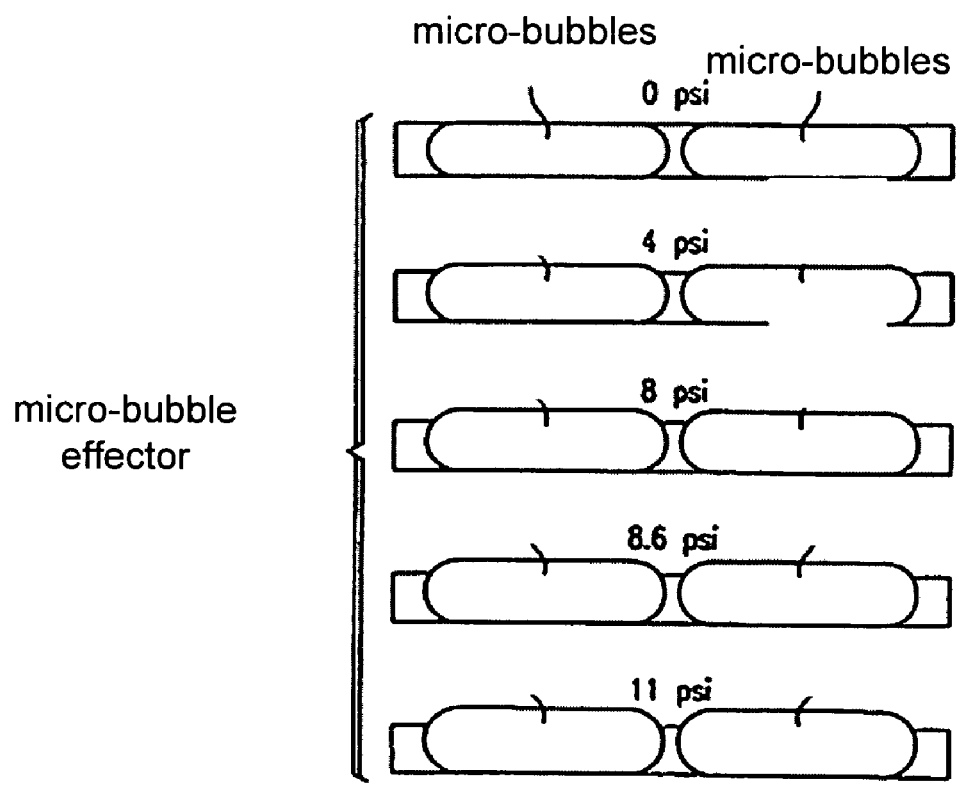

FIG. 9A depicts a synthetic jet effector. This type of effector uses a vibrating diaphragm, which bounds a cavity to generate an air jet. The oscillating surface draws fluid into the cavity from all directions and then expels it in a narrow jet. The resultant pulsed jet has no net mass flow. FIG. 9C presents a micro-bubble effector where micro-bubbles expand based on internal pressure to manipulate secondary flow structures. The effectors listed above are examples of possible MEMS devices, which may be used to manipulate primary fluid flow.

Sensor system 92 may receive input from conventional flow sensors or micro fabricated electro-mechanical sensor devices such as those illustrated in FIGS. 10A, 10B and 10C. FIG. 10A depicts sensor 90 as a MEMS sheer sensor. This device functions in a manner similar to a hot-film sheer stress sensor. A small surface flush with the duct wall is maintained at a constant temperature. The heat flux at the duct wall is then measured. This heat flux can be calibrated to sheer stress.

FIG. 10B depicts sensor 90 as a MEMS pressure sensor. FIG. 10C depicts sensor 90 as a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into the surface of the aft body region and communicate to sensor system 92, processor 94 and flow control device controller 88.

The aircraft such as depicted in the previous figures may be operable to manipulate flow fields over the entire aircraft's surface. This reduces buffeting, fatigue and jet wash while increasing control and stability. This involves utilizing the aerodynamic surfaces that have flow control device arrays located substantially upstream of the fluid flow over the surface. These flow control device arrays introduce secondary flows to form virtual control surfaces. An active control system may operably couple to the flow control device arrays to direct the operation of the flow control devices.

Figure 11:
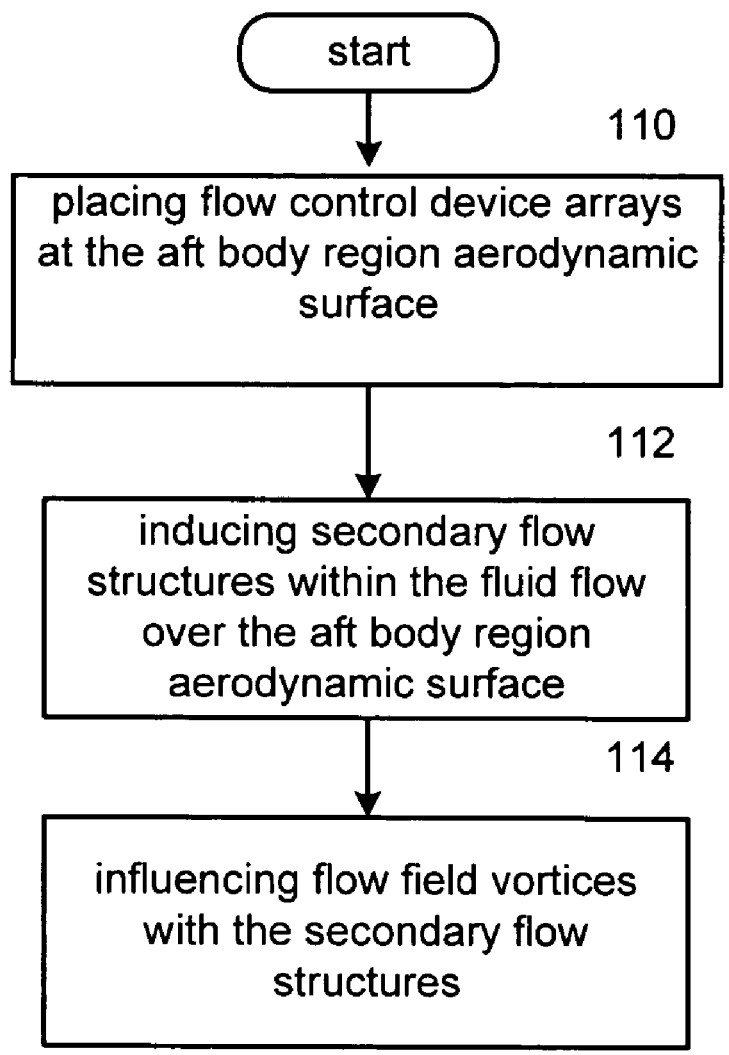
FIG. 11 provides a logic flow diagram illustrating one embodiment of the present invention.

FIG. 11 provides a logic flow diagram illustrating a method associated with the present invention. Generically, this method involves placing the flow control device arrays on the aerodynamic surface in step 110. Then, in step 112, secondary flow structures are induced within the fluid flow over the flow control device arrays. In step 114, trapped secondary flow structures form the basis of virtual aerodynamic surfaces that may be actively manipulated to realize improved vehicle control and stability.

Figure 12:
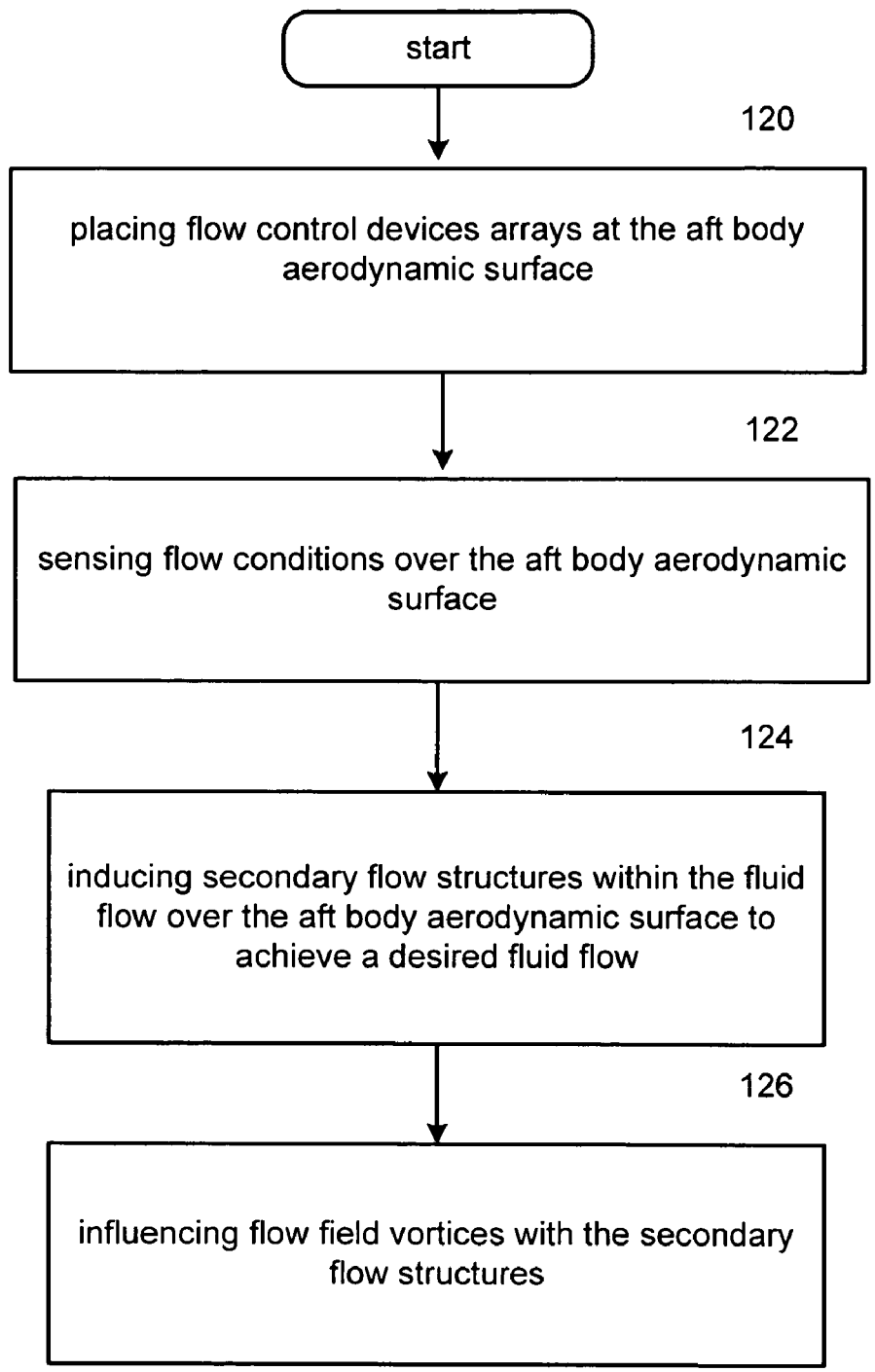
FIG. 12 provides a logic flow diagram depicting one methodology for implementing virtual control surfaces in accordance with embodiments of the present invention.

FIG. 12 provides a second logic flow diagram depicting the methodology associated with the present invention. In step 120, flow control device arrays are placed at the aerodynamic surface. Additionally, sensors at the aerodynamic surface sense flow conditions over the aerodynamic surface in step 122. The sensed flow conditions are used to direct flow control device arrays placed in step 120 to induce secondary flow structures in step 124 within the fluid flow in order to achieve the desired fluid flow. As in FIG. 10, the induced secondary flow structures influence the flow field vortical structures within the fluid flow in step 126.

The present invention enables new and improved aircraft designs of tactical aircraft by allowing unconventional aerodynamic shapes. Next generation aircraft, such as the BWB, X-45, or X-47 are examples of such vehicles employing advanced shaping techniques. Embodiments of the present invention may also be used to enable hydrodynamic vehicles such as submersibles as well.

Finally, the advanced design requirements for exhaust ducting pose significant challenges. The challenges require high aspect ratio and exotic aperture shaping of ducts or top-mounted inlets for ducts. Fluid flow control, such as that taught by the embodiment of the present invention, can be used to mitigate performance impacts on the aircraft. Additionally, attack geometries and sensing internal and external flow conditions at the aircraft and actively manipulating the fluid flow conditions at the aircraft to achieve desired fluid flow conditions at the aircraft will enhance dynamic conditions of the aircraft in flight. Fluid flow may be manipulated to meet several objectives including: (1) reduced component fatigue, (2) stable fluid flow within an internal ducting system, and (3) stable fluid flow external to the aircraft in dynamic geometries.

Additionally, flow control can reduce cyclic fatigue of components located within fluid flow. Stress peak amplitudes experienced by a component within the fluid flow for a normal flow can be greatly reduced by reducing or eliminating interactions between flow field vortical structure or jet wash and structural components.

Embodiments of the present invention may utilize micro vane or micro-jets either in an active or passive form to realize virtual control surfaces. This will result in multiple benefits including reduced drag, reduced weight, and may be used as an enabler for compact aircraft with respect to length.

Other embodiments may incorporate active or passive micro-jets or micro vanes on legacy aircraft to stability and control problems. Such embodiments may take the form of a mechanical appliqué that molds on the vehicle body in order to provide new or improved control surfaces.

The present invention may be used to improve flow behavior in hydrodynamic applications as well. This may minimize head loss in a piping system without requiring articulating fluid control systems or to control and manipulate hydrodynamic flow about a watercraft for direction and thrust control.

Further embodiments of the present invention may include air-handling units such as HVAC systems, chemical processors, and automobile air intake manifold or biomedical applications. However, the present invention should not be limited to these applications.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention.

What is claimed is:

1. A vehicle, comprising:
an exterior surface of the vehicle having a leading surface and a trailing surface;
an engine mounted to the vehicle for propelling the vehicle in a forward direction, creating a boundary layer of fluid flow over the trailing surface of the vehicle;
a plurality of micro-jet devices on the trailing surface, each of the micro-jet devices having an orifice for injecting a jet through the orifice, wherein the micro-jet devices are inclined in a forward direction relative to the portion of the trailing surface on which each of the micro-jet devices is mounted to direct the jets in a generally forward direction against the fluid flow to induce trapped vortices within the boundary layer of the fluid flow over the trailing surface of the vehicle; and
a control system communicatively coupled to the micro-jet devices, wherein the control system is operable to control the micro-jet devices in response to vehicle control commands to control movement of the vehicle.

2. The vehicle of claim 1, wherein the micro-jet devices are oriented relative to the trailing surface in the forward direction at an acute angle less than 90 degrees.

3. The vehicle of claim 1, wherein the entire trailing surface of the vehicle is free of any articulating control surfaces for controlling movement of the vehicle.

4. The vehicle of claim 1, further comprising:
a plurality of leading surface micro jet devices on the leading surface of the vehicle, each of the leading surface micro jet devices having an orifice for injecting a jet through the orifice, and wherein each of the leading edge micro jet devices is inclined at an acute angle in a forward direction relative to the portion of the leading surface on which each of the micro jet devices is mounted to induce trapped vortices within the boundary layer of the fluid flow over the leading surface of the vehicle; and
wherein the control system is operable to control the leading edge micro jet devices in response to vehicle control commands to control movement of the vehicle.

5. The vehicle control and stability system of claim 1, further comprising:
a flow sensor system operable to sense flow conditions proximate to the trailing surface of the vehicle; and
wherein the control system is operable in response to flow conditions sensed by the flow sensor system.

6. An aircraft, comprising:
a wing, an entire exterior surface of which is fixed and free of articulating flight control surfaces, the wing having a leading edge and a trailing edge;
an engine carried by the aircraft for propelling the aircraft, creating an air flow over the wing, the air flow having a boundary layer;
a plurality of micro-jet devices embedded in the leading edge and in the trailing edge of the wing, wherein each of the micro jet devices has an orifice for injecting a pulsed air jet through the orifice into the boundary layer of the air flow over the exterior surface of the wing;
each of the micro jet devices being oriented to inject the pulsed air jets at an acute angle less than 90 degrees relative to the portion of the surface on which the micro jet device is mounted and in a forward direction of the aircraft, so as to create trapped vortices in the boundary layer;
a vehicle control and stability system communicatively coupled to the micro-jet devices, wherein the control system is operable to control operation of the micro jet devices to control flight of the aircraft in response to control commands.

7. The aircraft of claim 6, wherein some of the micro-jet devices on the leading edge are oriented generally upward and some generally downward relative to the aircraft.

8. The aircraft of claim 6, wherein the micro jet devices comprise synthetic jet effectors, each having a diaphragm that is movable to create the pulsed air jets.

9. The aircraft of claim 6, further comprising:
a flow sensor system operable to sense flow conditions proximate to the micro-jet devices; and
wherein the vehicle control and stability system is operable in response to the flow conditions sensed by the flow sensor system.

10. A vehicle, comprising:
an exterior surface of the vehicle having a leading surface and a trailing surface, each of the surfaces being free of articulating control surfaces for controlling movement of the vehicle;
an engine mounted to the vehicle for propelling the vehicle in a forward direction, creating a boundary layer of fluid flow flowing in a rearward direction over the leading surface and trailing surface of the vehicle;
a plurality of micro jet devices on the leading surface and the trailing surface on opposite sides of a longitudinal axis of the vehicle, each of the micro jet devices having an orifice for injecting a jet through the orifice, wherein each of the micro jet devices is oriented to direct the jet forwardly and at an acute angle that is less than 90 degrees relative to the surface on which the micro jet is mounted, to induce trapped vortices within the boundary layer;
a control system communicatively coupled to the micro-jet devices, wherein the control system is operable to control the micro jet devices in response to vehicle control commands to control movement of the vehicle.

11. The vehicle of claim 10, wherein:
some of the micro jet devices on the leading surface are oriented to inject jets through their orifices in a generally downward direction; and
some of the micro jet devices on the leading surface are oriented to inject jets through their orifices in a generally upward direction.

* * * * *